(12) United States Patent
Regunathan et al.

(10) Patent No.: US 11,336,902 B1
(45) Date of Patent: May 17, 2022

(54) SYSTEMS AND METHODS FOR OPTIMIZING VIDEO ENCODING

(71) Applicant: Meta Platforms, Inc., Menlo Park, CA (US)

(72) Inventors: Shankar Lakshmi Regunathan, Redmond, WA (US); Haixiong Wang, Menlo Park, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/455,713

(22) Filed: Jun. 27, 2019

(51) Int. Cl.
```
H04N 19/00      (2014.01)
H04N 19/167     (2014.01)
H04N 19/17      (2014.01)
H04N 19/154     (2014.01)
H04N 19/64      (2014.01)
```

(52) U.S. Cl.
CPC ......... H04N 19/167 (2014.11); H04N 19/154 (2014.11); H04N 19/17 (2014.11); H04N 19/64 (2014.11)

(58) Field of Classification Search
CPC .... H04N 19/167; H04N 19/154; H04N 19/17; H04N 19/64
See application file for complete search history.

(56) References Cited

U.S. PATENT DOCUMENTS

| | | | | |
|---|---|---|---|---|
| 2012/0281139 A1* | 11/2012 | Zhang | ...................... | G06T 3/40 348/468 |
| 2014/0270505 A1* | 9/2014 | McCarthy | ............ | G06K 9/3266 382/165 |
| 2014/0281014 A1* | 9/2014 | Good | ................... | H04N 21/845 709/231 |
| 2018/0343489 A1* | 11/2018 | Loheide | ............. | H04N 21/6332 |
| 2020/0007883 A1* | 1/2020 | Toresson | .............. | H04N 19/107 |

OTHER PUBLICATIONS

Moritz. "3 Easy Ways to Add Your Own GIF Stickers on Instagram Stories". Feb. 2019. (Year: 2019).*
Forsey. "How to Take Your Instagram Stories to the Next Level With Stickers". Aug. 2018. (Year: 2018).*
"How to create your own stickers for Instagram Stories: Social Publi Blog". Apr. 2019. (Year: 2019).*
"JPEG coding using semantically salient Regions of Interest", URL: http://www.svcl.ucsd.edu/projects/ROI_coding/demo.htm, SVCL—Demo of ROI coding, Statistical Visual Computing Lab (UCSD), retrieved on Jun. 10, 2019, pp. 1-9.

* cited by examiner

*Primary Examiner* — Zhihan Zhou
(74) *Attorney, Agent, or Firm* — FisherBroyles, LLP (57) ABSTRACT

The disclosed computer-implemented method may include receiving, from a client device, a video and data about at least one specialized construct applied to the video. The method may also include detecting, based on the data about the specialized construct, a region of interest to apply the specialized construct to the video. Additionally, the method may include reapplying the specialized construct to the video at the region of interest. Furthermore, the method may include encoding the video by prioritizing bit rate allocation for the region of interest containing the specialized construct. Various other methods, systems, and computer-readable media are also disclosed.

20 Claims, 8 Drawing Sheets

SYSTEMS AND METHODS FOR OPTIMIZING VIDEO ENCODING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Video encoding may facilitate transferring videos from one device to another or broadcasting videos over a network connection. For example, a video file may be encoded and compressed on a user's mobile device due to limited bandwidth and sent to a server. Other users may then access the server using their own mobile devices, which may recognize the encoding and enable the users to play and watch the video. Video encoding and compression may often be performed again by the server to compress some or all of the video data to reduce the size of a video file. Through this process, large video files may remain a manageable size to store or stream.

Some software applications may enable users to apply various enhancements to a video, such as adding text or overlaying images onto the video. However, when the videos are encoded along with the enhancements and then compressed, the quality of these enhancements may be greatly reduced. For example, in order to compress a video file to a size that can be readily uploaded to a video-sharing service, a user's device may decrease the overall resolution of the video, making it difficult for viewers to properly see the enhancements or read added text. Furthermore, some server-side systems may perform additional encoding and compression to prepare the video for streaming or sharing, which may further degrade the quality of the enhanced constructs in the video. Thus, better methods of video encoding are needed to improve the quality of special video enhancements for optimal viewing.

The present disclosure is generally directed to systems and methods for optimizing video encoding. As will be explained in greater detail below, embodiments of the present disclosure may, by applying specialized constructs to a video at a server side rather than a client side, improve the quality of the final video after encoding and compression. The disclosed systems and methods may first receive data about the specialized constructs that are applied to a video separately from the encoded video itself. For example, the disclosed systems and methods may receive, from a client device, a separate file for data about each individual specialized construct and a file of the original video without the constructs. By using the data about the specialized constructs to identify where the constructs are applied to the video, the systems and methods described herein may reapply the specialized constructs at the server side. The disclosed systems and methods may then prioritize regions of interest where the specialized constructs are applied to the video for preferential encoding to ensure better video quality of the constructs. Furthermore, the disclosed systems and methods may compress the final encoded video at the server side to reduce loss from client-side compression.

In addition, the systems and methods described herein may improve the functioning of a computing device by improving video encoding to enable better storage and transmission of high quality videos. These systems and methods may also improve the fields of video compression and video streaming by prioritizing and improving the enhanced features of a video. Thus, the disclosed systems and methods may improve over traditional video encoding methods by preferentially encoding specialized constructs to ensure increased viewer experience of important focal regions.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 1:
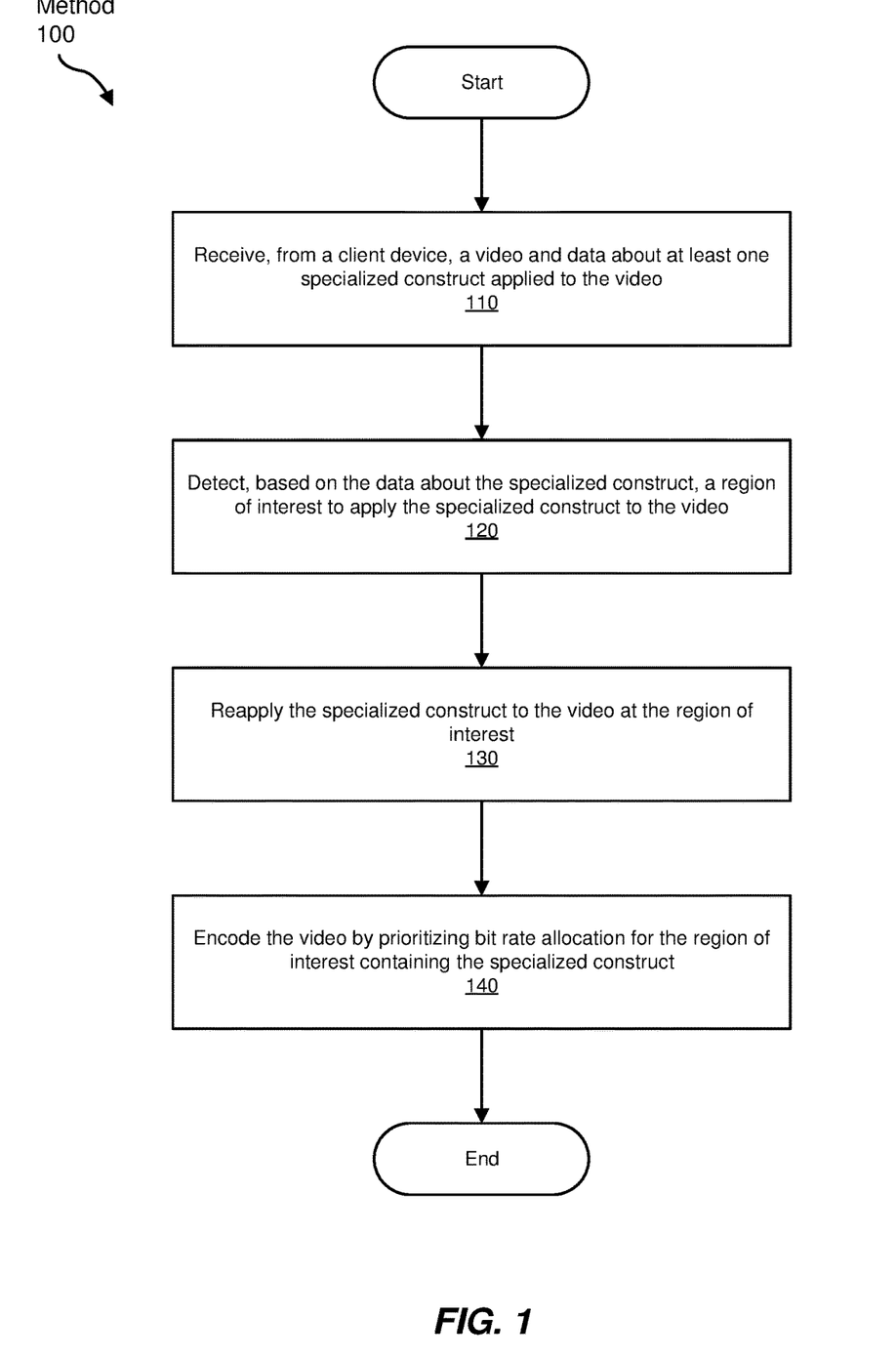
FIG. 1 is a flow diagram of an exemplary method for optimizing video encoding.

The following will provide, with reference to FIG. 1, detailed descriptions of computer-implemented methods for optimizing video encoding. Detailed descriptions of a corresponding exemplary system will be provided in connection with FIG. 2. In addition, detailed descriptions of exemplary files received from client devices for video encoding will be provided in connection with FIG. 3. Detailed descriptions of exemplary specialized constructs and exemplary regions of interest detected based on data about the specialized constructs will be provided in connection with FIGS. 4-5. Furthermore, detailed descriptions of the detection of regions of interest for relevant frames of an exemplary video will be provided in connection with FIG. 6. Finally, detailed descriptions of an exemplary bit rate allocation that prioritizes regions of interest in a video will be provided in connection with FIG. 7.

FIG. 1 is a flow diagram of an exemplary computer-implemented method 100 for optimizing video encoding. The steps shown in FIG. 1 may be performed by any suitable computer-executable code and/or computing system, including system 200 and client device 210 illustrated in FIG. 2. In one example, each of the steps shown in FIG. 1 may represent an algorithm whose structure includes and/or is represented by multiple sub-steps, examples of which will be provided in greater detail below.

Figure 2:
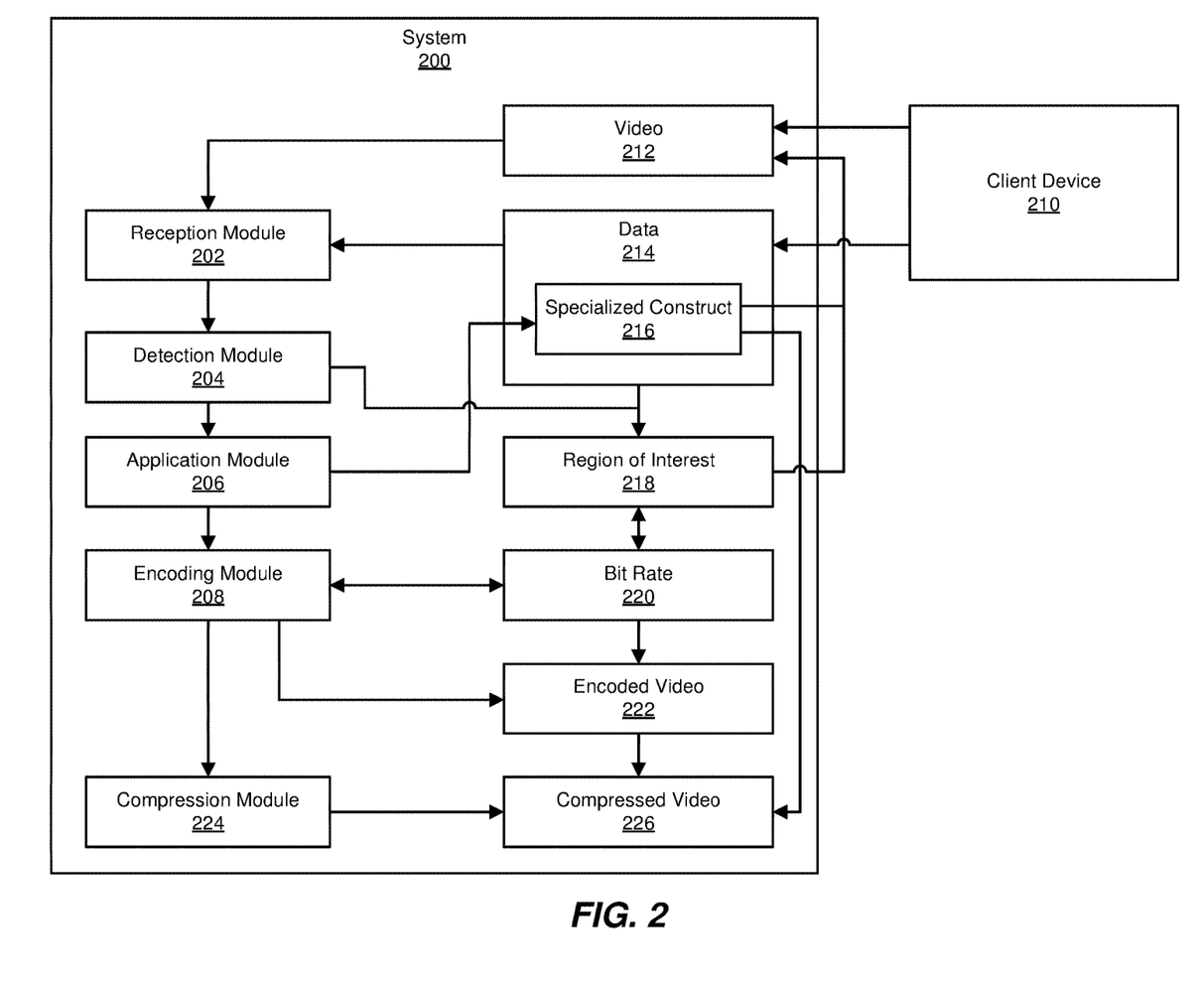
FIG. 2 is a block diagram of an exemplary system for optimizing video encoding.

As illustrated in FIG. 1, at step 110, one or more of the systems described herein may receive, from a client device, a video and data about one or more specialized constructs applied to the video. For example, FIG. 2 is a block diagram of an exemplary system 200 for optimizing video encoding. As illustrated in FIG. 2, a reception module 202 may, as part of system 200, receive, from a client device 210, a video 212 and data 214 about a specialized construct 216 applied to video 212.

The systems described herein may perform step 110 in a variety of ways. In one example, system 200 of FIG. 2 may represent one or more computing devices or servers that may be programmed with the modules of FIG. 2 and/or may store all or a portion of the data described herein. For example, system 200 may represent a server that is capable of storing and/or managing video data, such as video 212 and data 214, and may be capable of reading computer-executable instructions. Additional examples of system 200 may include, without limitation, application servers and database servers configured to provide various database services and/or run certain software applications, such as video storage and streaming services.

In some embodiments, client device 210 may generally represent any type or form of computing device capable of capturing and/or transmitting video data. Examples of client device 210 may include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device. In these embodiments, client device 210 may be directly in communication with system 200 and/or in communication via a network. In some examples, the term "network" may refer to any medium or architecture capable of facilitating communication or data transfer. Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like. For example, the network may facilitate data transfer between client device 210 and system 200 using wireless or wired connections.

In some embodiments, the term "apply" may refer to a method to integrate a construct with a video. For example, specialized construct 216 may be applied to video 212 by a user selecting specialized construct 216 and client device 210 overwriting frames of video 212 with images including specialized construct 216. Alternatively, the term "apply" may refer to only the selections of the construct and the method to integrate the construct with the video. For example, specialized construct 216 applied to video 212 may represent a construct selected to be integrated with video 212 but not yet overwritten. In other embodiments, specialized construct 216 may represent an image overlaid onto video 212 without overwriting original video 212. Additionally, client device 210 may send video 212 and data 214 to system 200 prior to overwriting the frames of video 212, thereby preserving the original frames of video 212. In these embodiments, data 214 may include instructions to integrate specialized construct 216 with video 212 by, for example, overwriting the frames of video 212.

In some examples, reception module 202 may receive video 212 and data 214 about specialized construct 216 by receiving a file containing video 212. In these examples, the file containing video 212 may include a video file previously encoded and compressed by client device 210 without specialized construct 216. In other words, the file may include only the original video without additional enhancements. In one example, reception module 202 may also receive data 214 about specialized construct 216 as part of the file containing video 212. In other examples, reception module 202 may receive a separate file containing data for each specialized construct for video 212.

In some embodiments, the terms "encoding" and/or "video encoding" may refer to a process of converting a video into a specific digital format that may be compatible and/or playable by one or more software applications. In some embodiments, the term "compression" may refer to a process of reducing the size and complexity required for storing and/or transmitting a file. In the example of FIG. 2, video 212 may be encoded by client device 210 into a format required by system 200 for streaming and compressed for transmitting to system 200.

Figure 3:
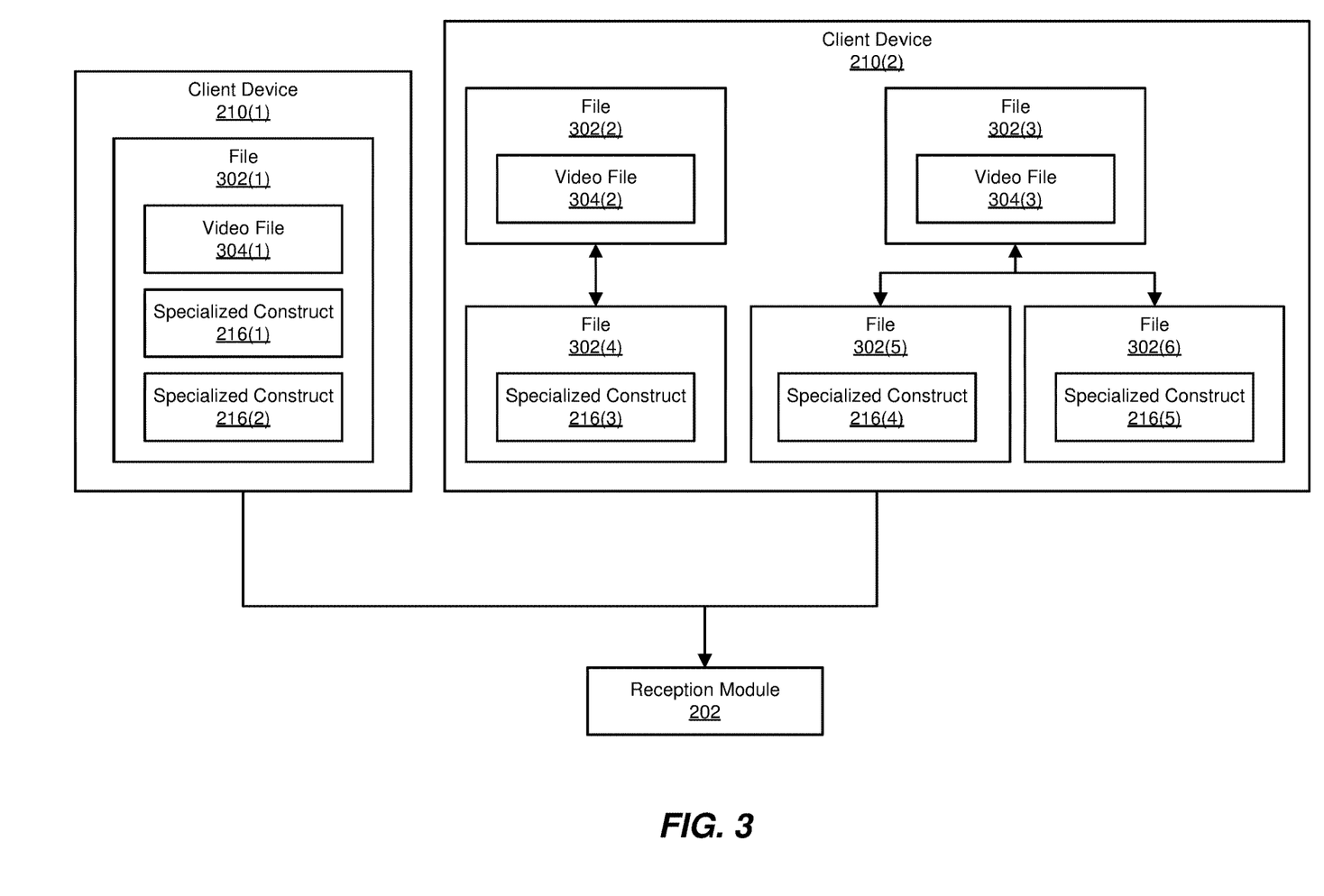
FIG. 3 is a block diagram of exemplary files received from client devices for video encoding.

As illustrated in FIG. 3, a client device 210(1) may transmit a file 302(1) containing a video file 304(1) and data about a specialized construct 216(1) and a specialized construct 216(2) that are associated with video file 304(1) to reception module 202. In this example, client device 210(1) may combine all data into a single file for transmission. Alternatively, a client device 210(2) may separately transmit video files and data about specialized constructs. For example, client device 210(2) may transmit files 302(2) and 302(3) containing video files 304(2) and 304(3) separately from files 302(4)-(6) containing data about specialized constructs 216(3)-(5). In this example, client device 210(2) may transmit a separate file for each specialized construct to reception module 202 of system 200. For example, file 302(4) of data about specialized construct 216(3) may include information indicating specialized construct 216(3) is associated with video file 304(2) while files 302(5) and 302(6) may include information indicating specialized constructs 216(4) and 216(5) are associated with video file 304(3).

In one embodiment, specialized construct 216 applied to video 212 of FIG. 2 may include a visual element overlaid onto video 212 and/or a visual element integrated with video 212. For example, specialized construct 216 may include text or a static image overlaid onto frames of video 212 and/or an animated image that moves with a video element.

Figure 4:
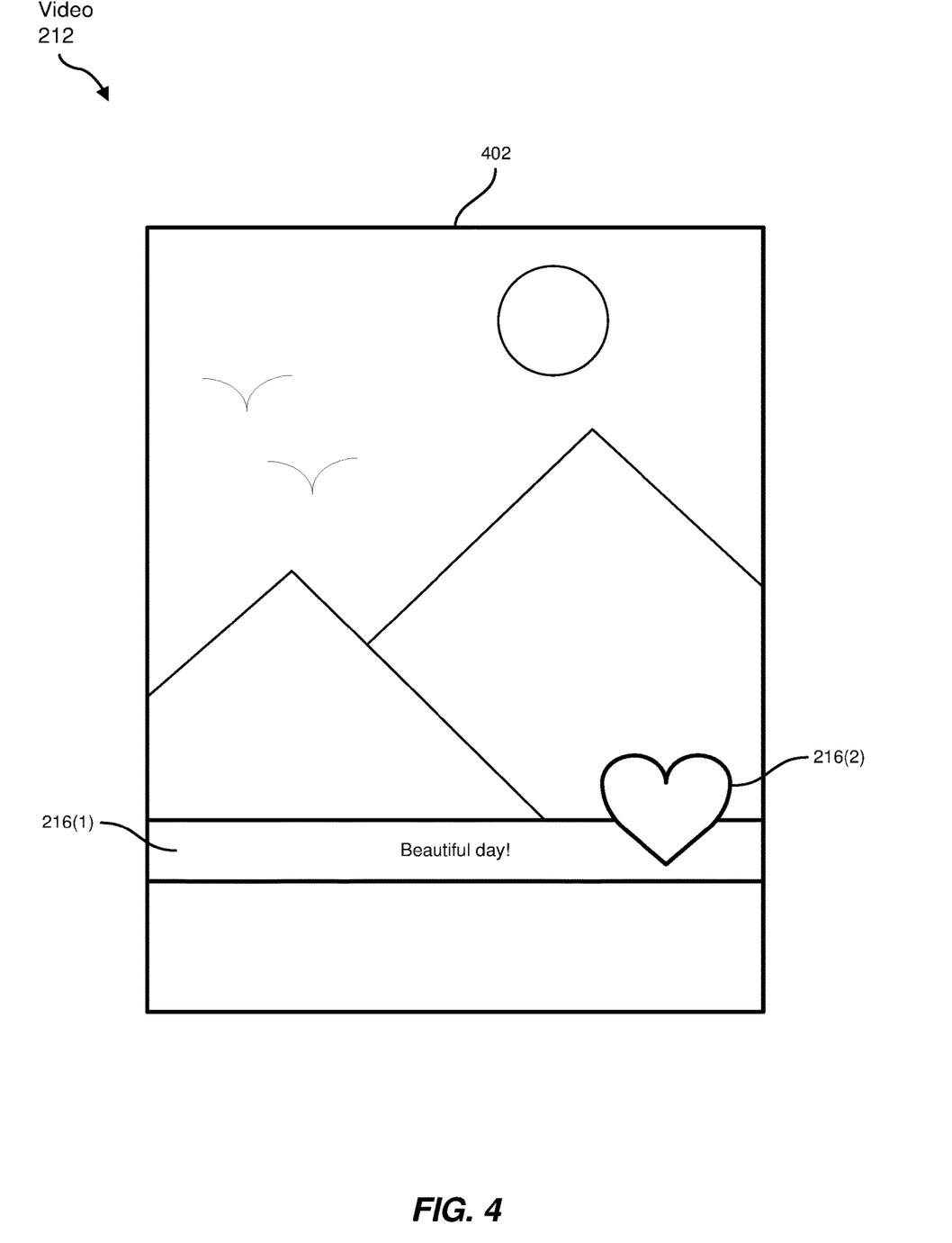
FIG. 4 illustrates exemplary specialized constructs applied to an exemplary frame of a video.

As illustrated in FIG. 4, a frame 402 of video 212 may include an image of an outdoor scene. In this example, frame 402 may also include specialized construct 216(1) that represents text overlaid onto the image of frame 402 and specialized construct 216(2) that represents an animated image overlaid onto the image of frame 402 and specialized construct 216(1). In other examples, frame 402 may include additional specialized constructs that interact with the image captured in frame 402 or with each other.

In some examples, data 214 about specialized construct 216 of FIG. 2 may include a location of specialized construct 216 in each frame specialized construct 216 appears in video 212 and a size of specialized construct 216 in each frame specialized construct 216 appears in video 212. In these examples, the location may be represented as coordinates within video 212 and/or may be anchored to specific elements identified within video 212. For example, the location of specialized construct 216(2) of FIG. 4 may be anchored to a point on specialized construct 216(1).

Figure 6:
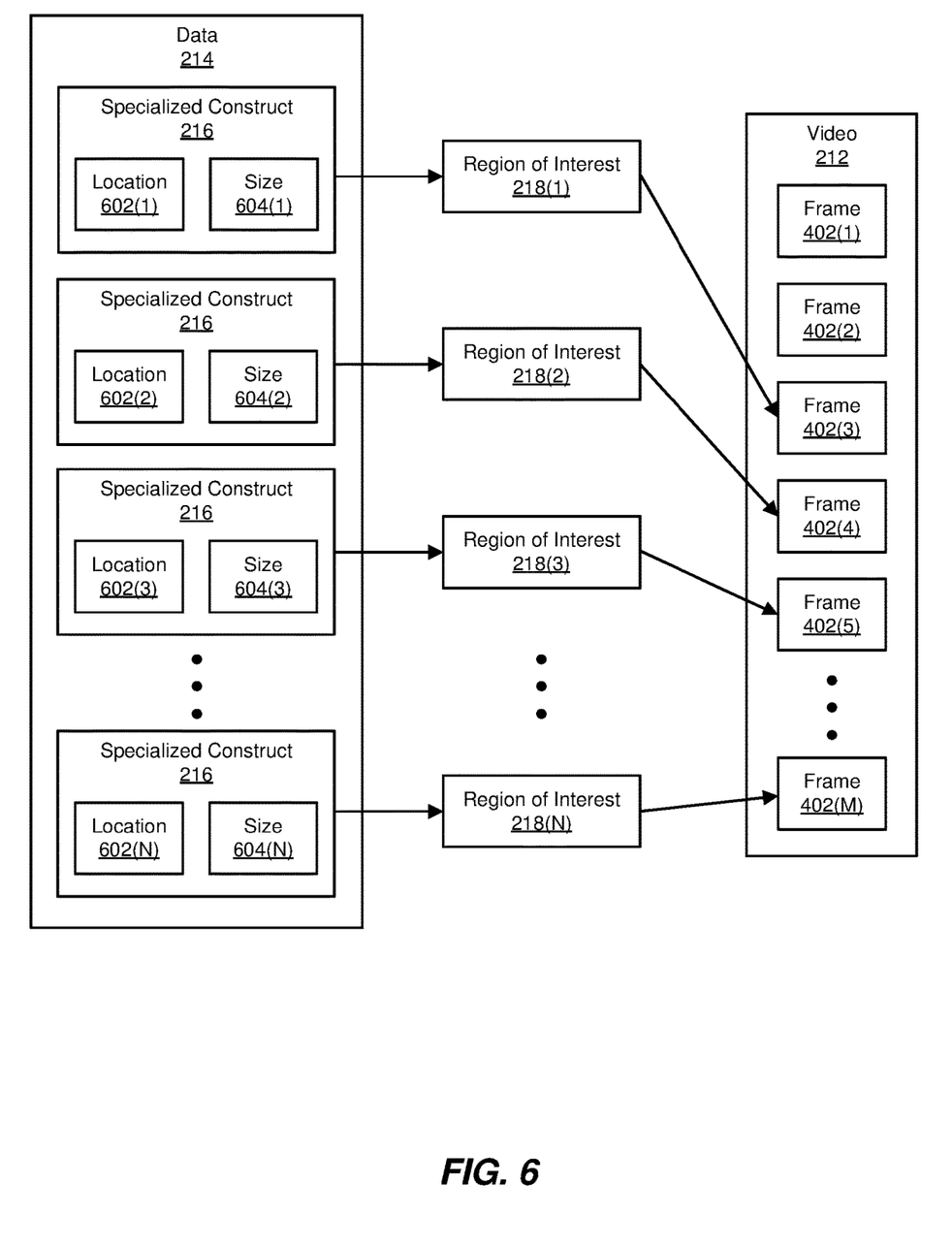
FIG. 6 is a block diagram of an exemplary detection of regions of interest for relevant frames of an exemplary video.

As shown in FIG. 6, data 214 may include different locations 602(1)-(N) and sizes 604(1)-(N) for specialized construct 216 corresponding to some frames 402(3)-(M) of video 212. In this example, specialized construct 216 may not appear in frames 402(1) and 402(2) of video 212.

Alternatively, some or all of locations 602(1)-(N) and/or sizes 604(1)-(N) may represent the same data for static specialized constructs that do not change across multiple frames. In other examples, data about additional specialized constructs may include locations and sizes for each frame in which those constructs also appear in video 212.

Returning to FIG. 1, at step 120, one or more of the systems described herein may detect, based on the data about the specialized construct, a region of interest to apply the specialized construct to the video. For example, a detection module 204 may, as part of system 200 in FIG. 2, detect, based on data 214 about specialized construct 216, a region of interest 218 to apply specialized construct 216 to video 212.

The systems described herein may perform step 120 in a variety of ways. In some embodiments, the term "region of interest" (ROI) may refer to a subset of data that is useful for a specific purpose, such as an area of an image that defines the boundaries containing a specialized construct. In some examples, detection module 204 may detect region of interest 218 by calculating region of interest 218 in each frame specialized construct 216 appears in video 212 based on the location of specialized construct 216 and the size of specialized construct 216. In these examples, a user may have selected a size and location of specialized construct 216 on client device 210, and data 214 may include the size and location. In other examples, detection module 204 may derive region of interest 218 from data 214 about specialized construct 216 by determining certain properties associated with specialized construct 216. For example, detection module 204 may determine that specialized construct 216 is a text box that always appears on the bottom of a video at a predefined size ratio in comparison to the video size. In these examples, region of interest 218 may also be determined using a size and/or an orientation of video 212, a list of other regions of interest in video 212, a type of specialized construct 216, or any other property of video 212 and/or specialized construct 216 that may contribute to the size and/or location of specialized construct 216.

Figure 5:
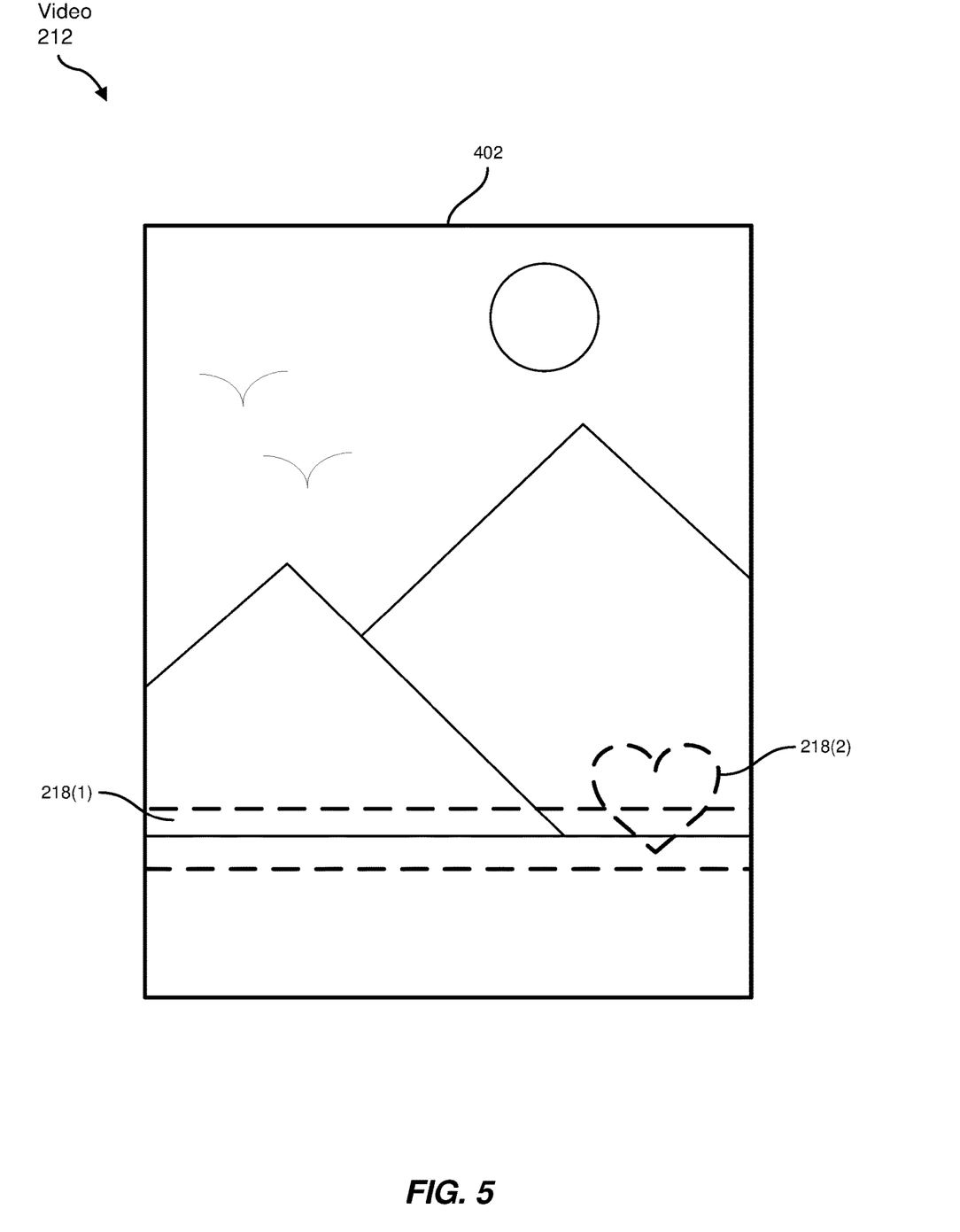
FIG. 5 illustrates exemplary regions of interest detected based on data about the specialized constructs.

As illustrated in FIG. 5, a region of interest 218(1) in frame 402 may outline the borders of specialized construct 216(1) of FIG. 4, and a region of interest 218(2) may outline specialized construct 216(2). In this example, regions of interest 218(1) and 218(2) may be calculated using the known locations and sizes of specialized constructs 216(1) and 216(2) from data 214. Similarly, in the example of FIG. 6, system 200 may calculate each of regions of interest 218(1)-(N) from the corresponding locations 602(1)-(N) and sizes 604(1)-(N) in data 214. In other examples, regions of interest 218(1) and 218(2) of FIG. 5 may be combined into a single region of interest encompassing both specialized construct 216(1) and 216(2).

Returning to FIG. 1, at step 130, one or more of the systems described herein may reapply the specialized construct to the video at the region of interest. For example, an application module 206 may, as part of system 200 in FIG. 2, reapply specialized construct 216 to video 212 at region of interest 218.

The systems described herein may perform step 130 in a variety of ways. In some embodiments, the term "reapply" may refer to a method of reintegrating a construct that was previously separated from a video, such as by applying the construct in the previous location in the video and overwriting the relevant frames of the original video. For example, application module 206 may reapply specialized construct 216 to video 212 by applying specialized construct 216 at the location of specialized construct 216 in each frame that specialized construct 216 appears in video 212. In these embodiments, application module 206 may then adjust the size of specialized construct 216 in each frame based on data 214. Additionally, application module 206 may attempt to reapply specialized construct 216 to match an original application of specialized construct 216 performed on client device 210. For example, a user of client device 210 may apply specialized construct 216 to video 212, client device 210 may transmit specialized construct 216 separately from video 212, and application module 206 may then reapply specialized construct 216 on server-side system 200 before encoding video 212 for streaming or transmission.

In the example of FIG. 6, system 200 may reapply specialized construct 216 to video 212 at each frame to match calculated regions of interest 218(1)-(N). Similarly, in the example of FIG. 5, system 200 may use regions of interest 218(1) and 218(2) to determine where to reapply specialized constructs 216(1) and 216(2) to reconstruct original frame 402 of FIG. 4.

Returning to FIG. 1, at step 140, one or more of the systems described herein may encode the video by prioritizing bit rate allocation for the region of interest containing the specialized construct. For example, an encoding module 208 may, as part of system 200 in FIG. 2, encode video 212 by prioritizing allocation of a bit rate 220 for region of interest 218 containing specialized construct 216.

The systems described herein may perform step 140 in a variety of ways. In one example, encoding module 208 may encode video 212 prior to streaming or transmitting video 212. Additionally or alternatively, encoding module 208 may encode video 212 during streaming or transmission. In some embodiments, the term "bit rate" may refer to the rate of data transfer over a network or digital connection. In these embodiments, bit rate may be expressed as the number of bits transmitted per second, such as megabits per second (Mbps). Additionally, bit rate may represent a network bandwidth and/or an expected speed of data transfer for videos over a network.

As shown in FIG. 2, encoding module 208 may encode video 212 after applying specialized construct 216 to create an encoded video 222. In some examples, encoding module 208 may prioritize allocation of bit rate 220 by allocating a proportion of bit rate 220, based on a predetermined quality metric for video 212, to region of interest 218. In these examples, the predetermined quality metric may include metrics such as video size, video resolution, video lag time, and/or any other measures of video quality. Specifically, the predetermined quality metric may evaluate the quality of specialized construct 216 within encoded video 222. Furthermore, the predetermined quality metric may be adjusted based on user preference or other variables to balance the quality of specialized construct 216 and overall encoded video 222.

Additionally, encoding module 208 may allocate a remaining proportion of bit rate 220 to portions of video 212 outside of region of interest 218. In these examples, encoding module 208 may prioritize a minimum quality of region of interest 218 over the quality of the remaining portions of video 212. By prioritizing region of interest 218, encoding module 208 may then ensure better video quality for specialized construct 216.

Figure 7:
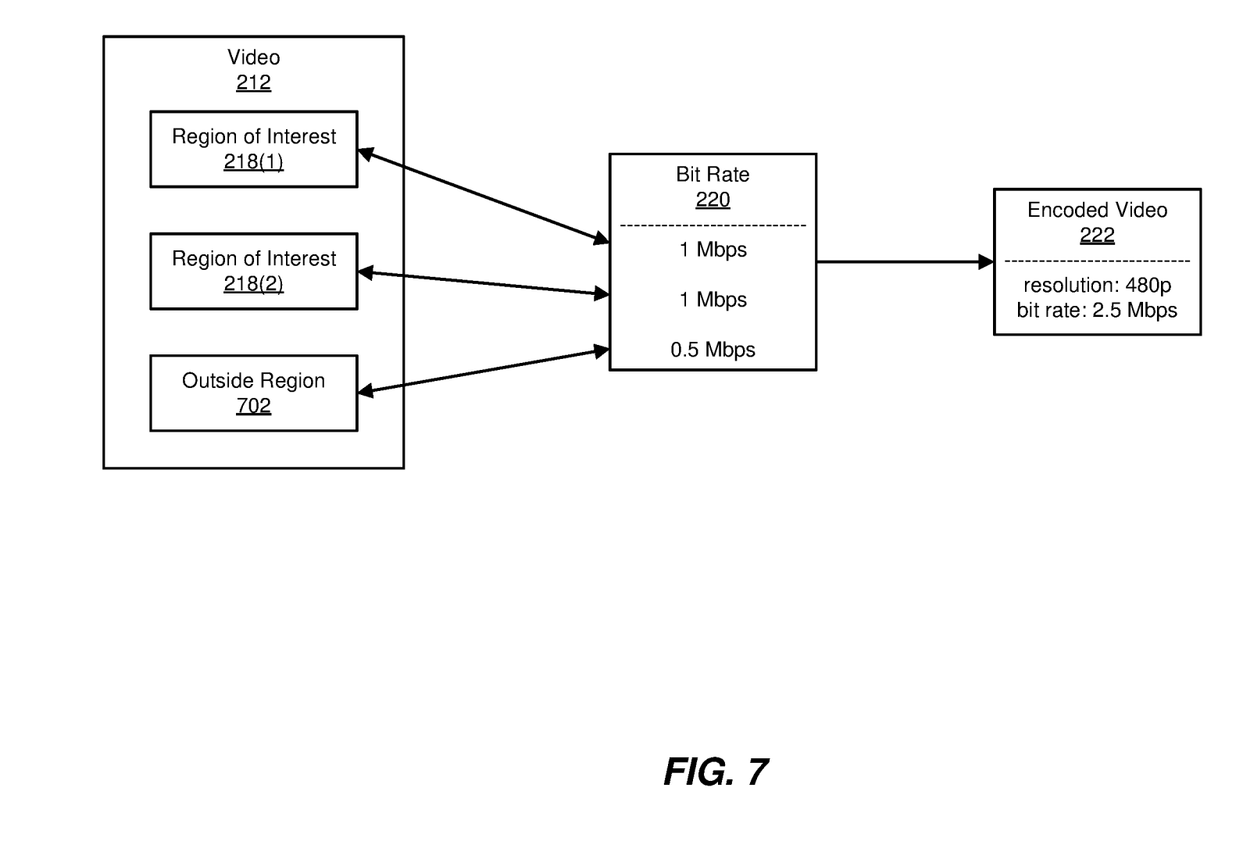
FIG. 7 is a block diagram of an exemplary bit rate allocation that prioritizes regions of interest in a video.

In the example of FIG. 7, video 212 may include separate regions of interest 218(1) and 218(2) and an outside region 702 containing remaining portions of video 212. In this example, bit rate 220 may be divided to allocate 1 Mbps for each of regions of interest 218(1) and 218(2), with the remaining 0.5 Mbps allocated to outside region 702. Additionally, the allocation of bit rate 220 may ensure the predetermined quality metric of 480p resolution applies to regions of interest 218(1) and 218(2) in encoded video 222. In this example, outside region 702 may potentially decrease in quality compared to regions of interest 218(1) and 218(2), based on the limits of the total available bit rate. Furthermore, in this example, encoded video 222 may include specialized constructs 216(1) and 216(2) of FIG. 4 incorporated into video 212 as a single video file.

The above described systems may further compress the encoded video with the specialized construct. For example, a compression module 224 may, as part of system 200 in FIG. 2, compress encoded video 222 with specialized construct 216, resulting in a compressed video 226. For example, due to incorporating specialized constructs into original video 212, encoded video 222 may need to be compressed to a smaller file size to transmit over a network or to store in a database of system 200. Thus, compression module 224 may compress encoded video 222 into compressed video 226 for ease of transmission or final storage on a server.

Figure 8:
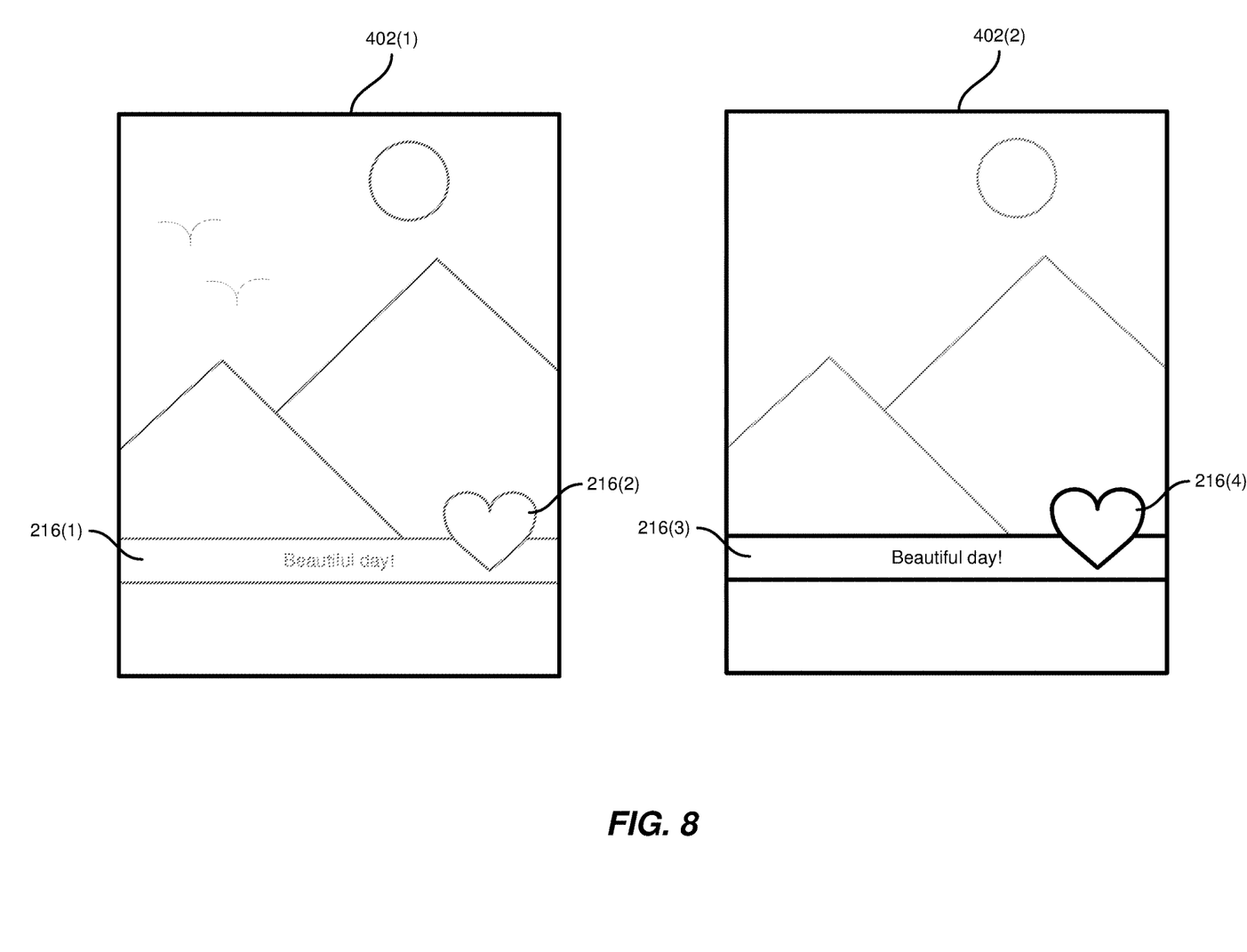
FIG. 8 illustrates an exemplary comparison of traditional encoding and preferential encoding for regions of interest.

As illustrated in FIG. 8, a frame 402(1) may be encoded without preferential encoding for regions of interest using traditional methods of encoding. In this example, additional compression may reduce the overall quality of the video, resulting in faded or blurry images throughout frame 402(1). In contrast, encoding module 208 of FIG. 2 may allocate bit rate 220 of FIG. 7 to provide more bits for regions of interest 218(1) and 218(2) in a frame 402(2). In this example, specialized constructs 216(3) and 216(4) may appear clearer than the other regions of frame 402(2), even after compression. However, due to prioritizing specialized constructs 216(3) and 216(4), some details of frame 402(2) that are not within a region of interest may be lost. By balancing an acceptable tradeoff between regions of interest and outside regions, encoding module 208 may allocate bit rate 220 to ensure compressed video 226 meets the predetermined quality metric.

In some embodiments, system 200 of FIG. 2 may then store compressed video 226 on a server or a cloud-based video service that may be accessed by users. In these embodiments, a user may share compressed video 226 with other users, such as by sharing a web address or permitting transmission of compressed video 226. In additional embodiments, system 200 may also store original video 212 to enable the user to adjust specialized construct 216 or add additional specialized constructs. Alternatively, system 200 may overwrite original video 212 with compressed video 226 and/or transmit compressed video 226 to the user to replace video 212 on client device 210.

As explained above in connection with method 100 in FIG. 1, the disclosed systems and methods may, by prioritizing regions of interest containing specialized constructs in videos, improve user experience in watching the videos. Specifically, the disclosed systems and methods may first receive a video file from a client device and data about each specialized construct applied to the video. For example, a user may capture a video on a mobile phone, apply virtual stickers and text to the video, and upload the video to a social media site. By separately receiving the original video and data about the enhanced constructs, the systems and methods described herein may ensure accurate data about the specialized constructs is received without loss due to encoding and compression on the client device. The systems and methods described herein may then use data about the location and size of each construct to identify a region of interest in the video where the construct is applied.

Additionally, the systems and methods described herein may encode the video by reapplying the specialized constructs. By prioritizing bit rate allocation at the regions of interest, the disclosed systems and methods may encode the video with better quality of the reapplied constructs. For example, because a user may add virtual stickers and text as focal points of a video, areas outside of the regions of interest may not have as great of an impact on a user's perception of the video. Therefore, by preferentially encoding these enhancements, the disclosed systems and methods may ensure greater quality at the most important areas of the video. Furthermore, by performing server-side encoding and compression of videos with reapplied specialized constructs, the disclosed systems and methods may prevent additional loss of data about the constructs due to multiple rounds of encoding and compression. Thus, the systems and methods described herein may improve the perception of quality for videos containing enhanced constructs.

Example Embodiments

Example 1: A computer-implemented method for optimizing video encoding may include 1) receiving, from a client device, a video and data about one or more specialized constructs applied to the video, 2) detecting, based on the data about a specialized construct, a region of interest to apply the specialized construct to the video, 3) reapplying the specialized construct to the video at the region of interest, and 4) encoding the video by prioritizing bit rate allocation for the region of interest containing the specialized construct.

Example 2: The computer-implemented method of Example 1, wherein receiving the video and the data about the specialized construct may include receiving a file containing the video, receiving the data about the specialized construct as part of the file containing the video, and/or receiving a separate file containing data for each specialized construct for the video.

Example 3: The computer-implemented method of Example 2, wherein the file containing the video may include a video file previously encoded and compressed by the client device without the specialized construct.

Example 4: The computer-implemented method of any of Examples 1-3, wherein the specialized construct applied to the video may include a visual element overlaid onto the video and/or a visual element integrated with the video.

Example 5: The computer-implemented method of any of Examples 1-4, wherein the data about the specialized construct may include a location of the specialized construct in each frame the specialized construct appears in the video and a size of the specialized construct in each frame the specialized construct appears in the video.

Example 6: The computer-implemented method of Example 5, wherein detecting the region of interest may include calculating the region of interest in each frame the specialized construct appears in the video based on the location of the specialized construct and the size of the specialized construct.

Example 7: The computer-implemented method of any of Examples 5 and 6, wherein reapplying the specialized construct to the video may include applying the specialized construct at the location of the specialized construct in each frame the specialized construct appears in the video and adjusting the size of the specialized construct in each frame the specialized construct appears in the video.

Example 8: The computer-implemented method of any of Examples 1-7, wherein prioritizing the bit rate allocation may include allocating a proportion of the bit rate, based on a predetermined quality metric for the video, to the region of interest and allocating a remaining proportion of the bit rate to the video outside of the region of interest.

Example 9: The computer-implemented method of any of Examples 1-8 may further include compressing the encoded video with the specialized construct.

Example 10: A corresponding system for optimizing video encoding may include several modules stored in memory, including 1) a reception module that receives, from a client device, a video and data about one or more specialized constructs applied to the video, 2) a detection module that detects, based on the data about a specialized construct, a region of interest to apply the specialized construct to the video, 3) an application module that reapplies the specialized construct to the video at the region of interest, and 4) an encoding module that encodes the video by prioritizing bit rate allocation for the region of interest containing the specialized construct. The system may also include one or more hardware processors that execute the reception module, the detection module, the application module, and the encoding module.

Example 11: The system of Example 10, wherein the reception module may receive the video and the data about the specialized construct by receiving a file containing the video, receiving the data about the specialized construct as part of the file containing the video, and/or receiving a separate file containing data for each specialized construct for the video.

Example 12: The system of Example 11, wherein the file containing the video may include a video file previously encoded and compressed by the client device without the specialized construct.

Example 13: The system of any of Examples 10-12, wherein the specialized construct applied to the video may include a visual element overlaid onto the video and/or a visual element integrated with the video.

Example 14: The system of any of Examples 10-13, wherein the data about the specialized construct may include a location of the specialized construct in each frame the specialized construct appears in the video and a size of the specialized construct in each frame the specialized construct appears in the video.

Example 15: The system of Example 14, wherein the detection module may detect the region of interest by calculating the region of interest in each frame the specialized construct appears in the video based on the location of the specialized construct and the size of the specialized construct.

Example 16: The system of any of Examples 14 and 15, wherein the application module may reapply the specialized construct to the video by applying the specialized construct at the location of the specialized construct in each frame the specialized construct appears in the video and adjusting the size of the specialized construct in each frame the specialized construct appears in the video.

Example 17: The system of any of Examples 10-16, wherein prioritizing the bit rate allocation may include allocating a proportion of the bit rate, based on a predetermined quality metric for the video, to the region of interest and allocating a remaining proportion of the bit rate to the video outside of the region of interest.

Example 18: The system of any of Examples 10-17 may further include a compression module, stored in memory, that compresses the encoded video with the specialized construct.

Example 19: The above-described method may be encoded as computer-readable instructions on a computer-readable medium. For example, a computer-readable medium may include one or more computer-executable instructions that, when executed by one or more processors of a computing device, may cause the computing device to 1) receive, from a client device, a video and data about one or more specialized constructs applied to the video, 2) detect, based on the data about a specialized construct, a region of interest to apply the specialized construct to the video, 3) reapply the specialized construct to the video at the region of interest, and 4) encode the video by prioritizing bit rate allocation for the region of interest containing the specialized construct.

Example 20: The non-transitory computer-readable medium of Example 19, wherein the computer-executable instructions may further cause the computing device to compress the encoded video with the specialized construct.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a video to be transformed, transform the video, output a result of the transformation to identify regions of interest in the video, use the result of the transformation to encode the video with specialized constructs, and store the result of the transformation to transmit the encoded video. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    receiving, by a server from a client device:
        a video encoded and compressed a first time by the client device; and
        data about at least one specialized construct applied by a user of the client device to the video;
    detecting, based on the data about the specialized construct, a region of interest to apply the specialized construct to the video;
    reapplying, by the server, the specialized construct to the video at the region of interest by matching an original application of the specialized construct by the user of the client device, wherein the specialized construct was separated from the video after the original application and before encoding for separate transmission to the server; and
    encoding and compressing the video a second, different time, by the server, with the specialized construct by prioritizing bit rate allocation for the region of interest containing the specialized construct.

2. The method of claim 1, wherein receiving the video and the data about the specialized construct comprises at least one of:
    receiving a file containing the video;
    receiving the data about the specialized construct as part of the file containing the video; or
    receiving a separate file containing data for each specialized construct for the video.

3. The method of claim 2, wherein the file containing the video comprises a video file previously encoded and compressed by the client device without the specialized construct.

4. The method of claim 1, wherein the specialized construct applied to the video comprises at least one of:
    a visual element overlaid onto the video; or
    a visual element integrated with the video.

5. The method of claim 1, wherein the data about the specialized construct comprises:
    a location of the specialized construct in each frame the specialized construct appears in the video; and
    a size of the specialized construct in each frame the specialized construct appears in the video.

6. The method of claim 5, wherein detecting the region of interest comprises calculating the region of interest in each frame the specialized construct appears in the video based on:
    the location of the specialized construct; and
    the size of the specialized construct.

7. The method of claim 5, wherein reapplying the specialized construct to the video comprises:
    applying the specialized construct at the location of the specialized construct in each frame the specialized construct appears in the video; and
    adjusting the size of the specialized construct in each frame the specialized construct appears in the video.

8. The method of claim 1, wherein prioritizing the bit rate allocation comprises:
    allocating a proportion of the bit rate, based on a predetermined quality metric for the video, to the region of interest; and
    allocating a remaining proportion of the bit rate to the video outside of the region of interest.

9. The method of claim 1, wherein encoding and compressing the video the second time comprises preparing the video with the specialized construct for sharing.

10. A system comprising:
    a reception module, stored in memory, that receives, by a server from a client device:
        a video encoded and compressed a first time by the client device; and
        data about at least one specialized construct applied by a user of the client device to the video;
    a detection module, stored in memory, that detects, based on the data about the specialized construct, a region of interest to apply the specialized construct to the video;
    an application module, stored in memory, that reapplies, by the server, the specialized construct to the video at the region of interest by matching an original application of the specialized construct by the user of the client device, wherein the specialized construct was separated from the video after the original application and before encoding for separate transmission to the server;

an encoding module, stored in memory, that encodes and compresses the video a second, different time, by the server, with the specialized construct by prioritizing bit rate allocation for the region of interest containing the specialized construct; and at least one processor that executes the reception module, the detection module, the application module, and the encoding module.

11. The system of claim 10, wherein the reception module receives the video and the data about the specialized construct by at least one of:

receiving a file containing the video;

receiving the data about the specialized construct as part of the file containing the video; or receiving a separate file containing data for each specialized construct for the video.

12. The system of claim 11, wherein the file containing the video comprises a video file previously encoded and compressed by the client device without the specialized construct.

13. The system of claim 10, wherein the specialized construct applied to the video comprises at least one of:

a visual element overlaid onto the video; or a visual element integrated with the video.

14. The system of claim 10, wherein the data about the specialized construct comprises:

a location of the specialized construct in each frame the specialized construct appears in the video; and a size of the specialized construct in each frame the specialized construct appears in the video.

15. The system of claim 14, wherein the detection module detects the region of interest by calculating the region of interest in each frame the specialized construct appears in the video based on:

the location of the specialized construct; and the size of the specialized construct.

16. The system of claim 14, wherein the application module reapplies the specialized construct to the video by:

applying the specialized construct at the location of the specialized construct in each frame the specialized construct appears in the video; and adjusting the size of the specialized construct in each frame the specialized construct appears in the video.

17. The system of claim 10, wherein prioritizing the bit rate allocation comprises:

allocating a proportion of the bit rate, based on a predetermined quality metric for the video, to the region of interest; and allocating a remaining proportion of the bit rate to the video outside of the region of interest.

18. The system of claim 10, wherein the encoding module encodes and compresses the video the second time by preparing the video with the specialized construct for sharing.

19. A non-transitory computer-readable medium comprising one or more computer-executable instructions that, when executed by at least one processor of a computing device, cause the computing device to:

receive, by a server from a client device:

a video encoded and compressed a first time by the client device; and data about at least one specialized construct applied by a user of the client device to the video;

detect, based on the data about the specialized construct, a region of interest to apply the specialized construct to the video;

reapply, by the server, the specialized construct to the video at the region of interest by matching an original application of the specialized construct by the user of the client device, wherein the specialized construct was separated from the video after the original application and before encoding for separate transmission to the server; and encode and compress the video a second, different time, by the server, with the specialized construct by prioritizing bit rate allocation for the region of interest containing the specialized construct.

20. The non-transitory computer-readable medium of claim 19, wherein the computer-executable instructions encode and compress the video the second time by preparing the video with the specialized construct for sharing.

* * * * *